United States Patent [19]

Fink et al.

[11] Patent Number: 4,980,431

[45] Date of Patent: Dec. 25, 1990

[54] PROCESS FOR PREPARING POLYOLEFINS, POLYDIENES AND COPOLYMERS THEREOF

[75] Inventors: Gerhard Fink; Eberhard Kinkelin, both of Müheim/Ruhr, Fed. Rep. of Germany

[73] Assignee: Studienegesellschaft Kohle, mbh, Mulheim/Ruhr, Fed. Rep. of Germany

[21] Appl. No.: 47,812

[22] Filed: May 8, 1987

Related U.S. Application Data

[63] Continuation of Ser. No. 827,834, Feb. 7, 1986, abandoned.

[30] Foreign Application Priority Data

Feb. 13, 1985 [DE] Fed. Rep. of Germany ....... 3504808

[51] Int. Cl.$^5$ .................. C08F 4/654; C08F 10/00
[52] U.S. Cl. .................... 526/151; 502/115; 526/125; 526/137; 526/351; 526/348.6; 526/352
[58] Field of Search ................ 526/151, 137

[56] References Cited

U.S. PATENT DOCUMENTS

| | | | |
|---|---|---|---|
| 2,905,645 | 9/1959 | Anderson et al. | 526/159 |
| 3,058,963 | 10/1962 | Vandenberg | 526/153 |
| 3,135,702 | 6/1964 | de Vries et al. | 526/159 |
| 4,113,654 | 9/1978 | Mayr et al. | 526/151 |
| 4,329,253 | 5/1982 | Goodall et al. | 526/125 |
| 4,476,288 | 10/1984 | Bujadoux | 526/151 |
| 4,476,289 | 10/1984 | Mayr et al. | 526/906 |
| 4,495,338 | 1/1985 | Mayr et al. | 526/125 |

FOREIGN PATENT DOCUMENTS

| | | | |
|---|---|---|---|
| 1299862 | 12/1972 | United Kingdom | 526/151 |
| 1543103 | 3/1979 | United Kingdom . | |

OTHER PUBLICATIONS

Fink et al, Makrolmol. Chem. 7 (1986), 85–89.

*Primary Examiner*—Edward J. Smith
*Attorney, Agent, or Firm*—Sprung Horn Kramer & Woods

[57] ABSTRACT

A process for the preparation of polyolefins, polydienes and copolymers thereof by polymerization in solvents, liquid monomers or in the gaseous phase at a temperature between $-20°$ C. and $150°$ C. using magnesium hydride, a halogen-containing transition metal compound of Group IV and an aluminium alkyl compound, characterized in that the polymerization is carried out in the presence of a catalyst system consists of (a) a magnesium compound having the general formula $$MgH_x$$

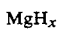

wherein x is a number between 1 and 2, and more specifically 2; (b) a compound of a transition metal of Group IV having the general formula $$MeHal_4$$

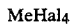

wherein Me is a transition metal, more specifically titanium, and Hal is a halogen, more specifically chlorine; and (c) an aluminium alkyl compound having the general formula $$AlR_nHal_{(3-n)}$$

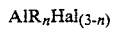

wherein R is a $C_1$–$C_6$ alkyl residue, more specifically ethyl, Hal is a halogen, more specifically chlorine, and n is a number of from 1 to 3, and preferably 3.

9 Claims, 1 Drawing Sheet

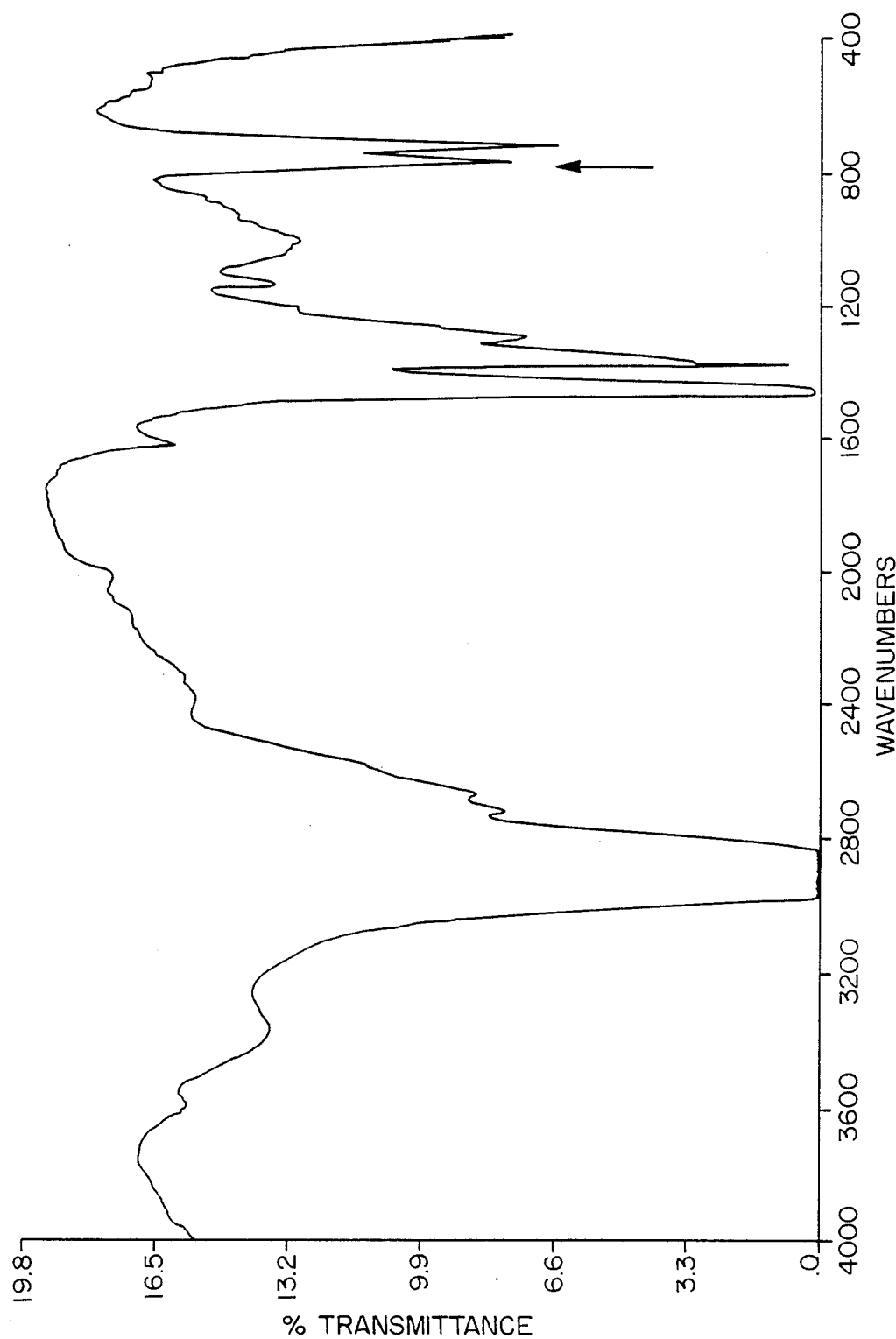

PROCESS FOR PREPARING POLYOLEFINS, POLYDIENES AND COPOLYMERS THEREOF

This is a continuation, of application Ser. No. 827,834, filed Feb. 7, 1986, now abandoned.

The present invention relates to a process for the polymerization of ethylene, other α-olefins and dienes using new catalysts and, more specifically, a process for preparing polyethylene, isotactic polypropylene and copolymers of ethylene with propylene or butene at a temperature between -20° C. and 150° C. using a heterogeneous support-fixed catalyst based on magnesium hydride, titanium tetrachloride and aluminium trialkyl.

Since 1953 it has been known that transition metal compounds in combination with main group metal alkyls, the so-called Ziegler catalysts, are capable of polymerizing ethylene at a low pressure and at a temperature below 100° C. A significant increase of the polymerization activity could be achieved due to the introduction of the so-called support-fixed Ziegler catalysts. In this method the transition metal compound prior to the polymerization is prereacted with the main group metal compound such as, e.g., silicon dioxide, magnesium oxide, magnesium chloride or magnesium alkyls whereby the transition metal is "fixed" onto the surface of the support. By the addition of an organic electron donor compound such as, e.g., benzoic acid ethyl ester it is possible to effect stereospecific polymerizations of ζ-olefins. One possibility of increasing the polymerization activity is grinding the catalyst or individual components thereof to increase the specific surface area of the catalyst.

In the present invention there is proposed a process using a catalyst which is obtainable from readily available commercial starting materials, can be prepared easily and quickly and, moreover, owns the substantial advantage of that the basic component magnesium hydride a priori has a very high specific surface area and, therefore, there is no need for a grinding operation in the preparation of the catalyst.

In 1979 Bogdanovic /-DE-OS 28 04 445 (1979) and Angew. Chem. 92, 845 (1980)-/ disclosed a process for preparing a highly active magnesium hydride in very high yields by hydrogenation of magnesium anthracene and magnesium in the presence of a transition metal catalyst. Said magnesium hydride, in contrast to the magnesium hydride as previously produced on a commercial scale, is capable of undergoing a simple reaction with titanium tetrachloride to give a catalyst suitable to polymerize ethylene and α-olefins with high yields. An essential advantage thereof is that the magnesium hydride, as a fine gray powder, has a very high specific surface area of about 90 m$^2$/g and that said specific surface area may even be enlarged up to about 150 m$^2$/g, depending on the type of treatment with titanium tetrachloride.

The catalyst is generally prepared by the reaction of magnesium hydride and titaniumtetrachloride in a hydrocarbon at a temperature of 90° C. for 2 hours. Said catalyst is usable after simply having been dried in vacuum without any further treatment. Activity and surface area of the catalyst are readily controllable by the variation of the molar ratio of magnesium hydride to titanium tetrachloride. Thus, a catalyst prepared with a molar ratio of magnesium hydride to titanium tetrachloride of 40:1 has a surface 4 to 5 times larger and an activity 3 to 4 times higher than those of a catalyst prepared with said ratio being 1:1. The titanium load of the catalyst may be adjusted within limits between 4 and 15% by weight. Thus, in comparison to the previous Ziegler catalysts, smaller amounts of titanium tetrachloride ar required.

Furthermore, the time-consuming pre-treatment of the catalyst such as, e.g., grinding in a ball mill for 24 hours in the presence of various additives, are no longer required to produce specific surface areas.

When the magnesium hydride prior to the reaction with titanium tetrachloride is subjected to a treatment with hydrogen chloride, then a catalyst system is formed which, even upon reaction with an excess of titanium chloride only contains low amounts of titanium (1 to 3% by weight) while it has an activity higher by 3 to 4 times than the system obtained using an untreated magnesium hydride.

In order to attain a maximum polymerization activity, in the present process aluminium alkyl amounts in a molar ratio aluminium to titanium of 10:1 are required. With most of the prior art catalysts the required molar ratios are 100:1 or more. Thus, the amount of the aluminium alkyl which is difficult to handle is also reduced.

When the polymerization is carried out in a solvent, it is advantageous to employ catalyst concentrations of $10^{-3}$ mol/l, based on titanium. The most appropriate temperature is from 20° C. to 100° C., and preferably at 30° C. By a suitable selection of the polymerization temperature the molecular weight of the produced polyethylene may be adjusted to a value within a wide range of, e.g., from 600 000 at 60° C. to 7 000 000 at 0° C. A reduction in molecular weight may also be effected by polymerization in the presence of hydrogen.

The produced polyethylene in general is one having a high molecular weight (in excess of 1 million) and exhibits a molecular weight distribution $M_w/M_n$ equal to about 7. The polyethylene has a high density and a high degree of crystallinity.

The density and molecular weight are controlled by polymerizing in the presence of small amounts of α-olefins such as, e.g., butene and hexene.

In the homopolymerization of α-olefins such as, e.g., propene and butene, an isotactic polypropylene or polybutene, respectively, is prepared by using the above catalyst system. Contrary to the previously known systems, it is not required to use any additives, for example electron donors such as e.g., benzoic acid ethyl ester or the like.

In the copolymerization of ethylene with propene or butene there are obtained copolymers the compositions of which can deliberately be chosen. In accordance with the IR spectroscopical results the propene or butene units, respectively, are present in said copolymers in the form of blocks.

Brief Description of the Drawings

The attached Figure shows the IR spectrum of a poly(ethylene/butene-1) copolymer. The peak at 770 cm$^{-1}$ relates to the proportion of polybutene sequences (cf. Hummel-Scholl, Atlas der Polymer- und Kunststoffanalyse, vol. 1, page 11, spectrum # 33).

If in the polymerization of ethylene only small traces of an α-olefin such as, e.g., propene or butene are added, then an increase by the factor 2 of the polymerization activity is observed.

The present invention is further illustrated by the following non-limiting examples.

EXAMPLE 1

A 250 ml two-neck flask pre-conditioned by heating and purging with argon was charged with 3.4 g (0.13 moles) of MgH2 and 100 ml of dry toluene. The $MgH_2$ had been prepared according to the procedure described by Bogdanovic -/-DE-OS 28 04 445 (1979)/.

Analytical data: 83.78% Mg; 5.68% C; 7.60% H; 1.03% Ti; 2.55% Cl.

After 15 minutes of pre-treatment in an ultrasonic bath 0.6 g (0.003 moles) of $TiCl_4$ in 20 ml of toluene were dropwise added, and the mixture was stirred and heated at 90° C. for 2 hours. The final product was washed several times with fresh dry toluene and dried under vacuum for 10 hours. There were obtained 3.7 g of a finely divided grey powder having a specific surface area of 141 m²/g.

Analytical data: 4.81% Ti; 14.85% Cl.

EXAMPLE 2

On the analogy of Example 1 there were charged 22.68 g (0.86 moles) of $MgH_2$ in 150 ml of dry toluene.

Analytical data: 90.10% Mg; 2.24% C; 5.71% H; 0.67% Ti; 0.99% Cl.

After the treatment in an ultrasonic bath the black-grey suspension was thermostated at 90° C., and gaseous hydrogen chloride was passed therethrough for 7 hours. Upon washing several times with toluene there were obtained 29.2 g of a light grey fine powder.

Analytical data: 64.88% Mg; 4.14% C; 3.90% H; 0.77% Ti; 23.84% Cl.

15.51 g (0.41 moles) of this substance were reacted as in Example 1 with 78.46 g (0.41 moles) of $TiCl_4$ to give 15.71 g of a light brown fine powder.

Analytical data: 0.98% Ti; 25.96% Cl.

EXAMPLE 3

A 500 ml glass autoclave pre-conditioned by heating and purging with argon was charged with 312 mg of a catalyst prepared as in Example 1 and having a Ti content of 4.81% (0.31 millimoles of Ti) in 270 ml of toluene. Prior to use the catalyst in 50 ml of toluene had been pre-treated in an ultrasonic bath. The dark brown suspension was thermostated at 20° C., degassed by multiple short-time application of vacuum and saturated with ethylene under a static pressure of 2 bar. Then 0.09 ml (0.63 millimoles) of triethylaluminium were charged in an ethylene countercurrent into a glass vessel mounted inside the reactor and surrounded by the slightly agitated catalyst suspension thereby being adjusted to the same temperature. Following a renewed saturation with ethylene under 2 bar, by means of a spontaneous increase of the rotation speed of the stirrer the aluminium component was rinsed from the vessel and mixed with the catalyst suspension within less than 1 second. Within 10 seconds there appeared segregated polymer flakes within the otherwise clear light brown liquid. The reaction was monitored with a flow meter under a constant ethylene pressure of 2 bar. In the course of 9 minutes the temperature rose to more than 45° C. and then slowly decreased to 30° C. After 20 minutes the reaction was stopped by addition of methanol, the polymer was stirred in a methanol/HCl mixture, filtrated, several times washed with methanol and dried under vacuum. The yield was 23.9 g of a white fine-grain powder. The activity was calcultated to be 4 825 g of polyethylene (PE) per gram titanium and per hour. The average molecular weight as determined by viscosimetry was 3 700 000.

EXAMPLE 4

In the homopolymerization of higher $\zeta$-olefins the reaction was monitored by means of a pressure recorder. The monomer is added to a pressurization up to 2 bar. After a pressure drop to 1.6 bar the curve of pressure vs. time is linear and the monomer is again added under pressure.

Propene was polymerized at 20° C. using 399 mg catalyst prepared according to Example 1 having a titanium content of 10.68% (0.89 millimoles) and 0.24 ml (1.78 millimoles) of aluminium triethyl. The polymerization procedure as further carried out was on the analogy of Example 3. After 30 minutes the yield was 4.1 g of isotactic polypropylene (PP) having a soft consistency and an average molecular weight of 150 000. The activity was 200 g of PP per gram titanium and per hour.

EXAMPLE 5

Butene was polymerized at 20° C. on the analogy of Example 4. The pressure was measured within the range of from 1 bar to 0.6 bar. Upon use of 769 mg of catalyst prepared according to Example 1 having a titanium content of 7.29% (1.17 millimoles) and 0.32 ml (2.34 millimoles) of triethyl aluminium, there were obtained after a polymerization period of 1 hour 4.0 g of a soft isotactic polybutene having an average molecular weight of 260 000. The activity was calculated to be 70 g of polybutene (PB) per gram titanium and pe hour.

EXAMPLE 6

The polymerization was carried out on the analogy of Example 3. Prior to saturation with ethylene there were introduced 16 g of butene 1 by condensation. Upon pressurization with ethylene to 2 bar the polymerization was initiated by increasing the revolution of the stirrer. Upon use of 501 mg (0.76 millimoles) of catalyst (according to Example 5) and 0.21 ml (1.52 millimoles) of triethyl aluminium, there were obtained after 20 minutes 14.8 g of a copolymer having an average molecular weight of 150 000. The PE/PB copolymer is composed of crystalline PE regions and isotactic PB blocks. The activity is 1220 g of polymer per gram titanium and per hour, as compared to 70 g of polymer per gram titanium and per hour for neat butene and 910 g of polymer having a molecular weight of 1,100,000 per gram titanium and per hour for neat ethylene.

EXAMPLE 7

Using 610 mg of a catalyst prepared in accordance with Example 2, having a Ti content of 0.98% (0.12 millimoles) and 0.17 ml (1.25 millimoles) of triethyl aluminium, ethylene was polymerized at 30° C. and under a pressure of 2 bar on the analogy of Example 3. The segregation of the polymer flakes was also to be observed, however the flakes themselves were smaller than with a polyethylene produced using a catalyst prepared according to Example 1. After 30 minutes the yield of a white fine-grain polyethylene having an average molecular weight of 1 100 000 was 44.7 g. Therefrom the activity was calculated to be 14 950 g of PE per gram titanium and per hour.

EXAMPLE 8

At the same Ti concentration of 0.35 mmol/l and a molar ratio of aluminium/titanium of 10:1 polyethylene was prepared using catalyst as in Example 7 at various temperatures for a period of 30 minutes each. The results were as follows:

| Temperature (°C.) | Activity (g PE/g Ti) | Molecular Weight |
|---|---|---|
| 0 | 2 430 | 6 700 000 |
| 5 | 4 690 | 6 300 000 |
| 10 | 11 860 | 3 300 000 |
| 20 | 14 070 | 1 350 000 |
| 30 | 14 950 | 1 100 000 |
| 40 | 12 500 | 850 000 |
| 50 | 12 760 | 770 000 |
| 60 | 12 330 | 600 000 |

EXAMPLE 9

Using 854 mg of a catalyst prepared in accordance with Example 2 having a Ti content of 1.55% (0.28 millimoles) and 0.08 ml (0.056 millimoles) of triethyl aluminium, propane was polymerized on the analogy of Example 4. The yield after 60 minutes was 20.3 g of polypropylene having an average molecular weight of 200 000. The activity was found to be 1 540 g of PP per gram titanium and per hour.

What is claimed is:

1. In the polymerization of an olefin in a solvent, liquid monomer or in the gaseous phase at a temperature between -20° C. and 150° C. using magnesium hydride, a halogen-containing compound of a transition metal of Group IV and an aluminum alkyl compound, the improvement which comprises effecting the polymerization in the presence of a catalyst system consisting of
   (a) a magnesium compound having the general formula $MgH_x$ wherein x is a number between 1 and 2, and having a surface area of about 90 to 150 $m^2/g$;
   (b) a compound of a transition metal of group IV having the general formula $MeHal_4$ wherein Me is the transition metal, and Hal is a halogen; and
   (c) an aluminum alkyl compound having the general formula $ALR_nHal_{(3-n)}$ wherein R is a $C_1$–$C_6$ alkyl residue, Hal is a halogen, and n is a number of from 1 to 3.
2. The process according to claim 1, wherein the polymerization is carried out in the presence of a catalyst consisting of (a) magnesium hydride or its reaction product with hydrogen chloride or chlorine, (b) titanium tetrachloride and (c) aluminum triethyl.
3. The process according to claim 2, wherein the catalyst is prepared at a molar ratio of magnesium hydride to titanium tetrachloride of from $10^2$:1 to $10^{-2}$:1.
4. The process according to claim 2, wherein the aluminum : titanium ratio is from $10^2$:1 to 1:1.
5. The process according to claim 2, wherein the polymerization is effected in a solvent at a titanium concentration of from $10^{-2}$ to $10^{-4}$ mol/l.
6. The process according to claim 1, wherein the olefin is ethylene and the activity of the catalyst is increased by addition of a small amount of propene or butene.
7. The process according to claim 1, wherein the olefin is propene or butene and isotactic polypropylene or polybutene is formed.
8. The process according to claim 1, wherein the olefin is ethylene plus propene and/or butene.
9. The process according to claim 1, wherein the olefin is a mixture of ethylene and hexene, whereby the density and the molecular weight of the polymer are reduced.

* * * * *